United States Patent
Sera

(10) Patent No.: US 6,259,474 B1
(45) Date of Patent: Jul. 10, 2001

(54) METHOD FOR RECORDING/ REPRODUCTION BY RECORDING/ REPRODUCING SYSTEM FOR VISUAL INSPECTION DEVICE

(75) Inventor: Yoshihiro Sera, Komaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/145,883

(22) Filed: Sep. 2, 1998

(30) Foreign Application Priority Data

Sep. 5, 1997 (JP) .................................................. 9-240734

(51) Int. Cl.$^7$ ...................................................... H04N 7/18
(52) U.S. Cl. ............................................ 348/82; 73/865.8
(58) Field of Search ................................... 348/82, 83, 84, 348/85, 128, 92; 702/6, 34–35; 73/104, 865.8

(56) References Cited

U.S. PATENT DOCUMENTS 4,888,720 * 12/1989 Fryer ..................................... 702/159
6,002,993 * 12/1999 Naito et al. ............................ 348/83

OTHER PUBLICATIONS

Hiroshi Sasama et al., Railroad and Electric Technology, vol. 6, No. 8, Image Data Base of Facilities Having Great Lengths, pp. 49–52, Aug. 1995.

* cited by examiner

*Primary Examiner*—Vu Le

(57) ABSTRACT

While a vehicle is traveling, a line sensor camera shoots a tunnel wall surface. Line images from the line sensor camera which outputs a line image equivalent to one line from 2,048 pixels are digitized, and stored in a buffer memory in a state arranged in a moving direction of the line sensor camera. Whenever image data corresponding to 2,048 pixels×472 lines are stored, the image data are divided into four plane image data each composed of 512 pixels×472 lines. Each plane image is converted to a video image signal by a video signal converter in chronological order, and the video image signal is recorded on a video tape by a video deck. The recorded video tape is played back by another video deck, and a reproduced image is image processed by an image processor, whereby the state of the tunnel wall surface can be inspected. Thus, the equipment cost is reduced, and the time required for inspection shortened.

6 Claims, 7 Drawing Sheets

METHOD FOR RECORDING/ REPRODUCTION BY RECORDING/ REPRODUCING SYSTEM FOR VISUAL INSPECTION DEVICE

BACKGROUND OF THE INVENTION

This invention relates to a method for recording/ reproduction by a recording/reproducing system for a visual inspection device. This invention is so designed that the recording/reproducing system for a visual inspection device can be produced at a low cost, and the time required for inspection can be shortened.

FIG. 7 shows the construction of a conventional tunnel wall surface inspection device. This tunnel wall surface inspection device is intended to perform the surface inspection of a long structure, such as a tunnel wall surface, with a high accuracy (a fine image resolving power).

As shown in FIG. 7, a line sensor camera 02 is installed on a vehicle 01 of the tunnel wall surface inspection device. The line sensor camera 02 shoots a tunnel wall surface T when the vehicle 01 is traveling. With the line sensor camera 02, single shooting gives an image only as one line (line image). However, the line sensor camera 02 takes pictures continuously while moving in a direction perpendicular to the direction of arrangement of pixels of the line sensor camera 02. By arranging the resulting line images in the moving direction of the line sensor camera 02, a plane image elongated in a band form in the moving direction can be obtained. Thus, the use of the line sensor camera 02 enables images to be shot with a fine image resolving power.

The vehicle 01 is also equipped with an odometer 03, which measures a distance traveled by the vehicle 01. Data on the traveled distance detected is recorded so as to overlap at the front of the line image data.

A recording system 04 is also mounted on the vehicle 01. The recording system 04 is composed of an A/D converter 05, a hard disk 06, and an MO recording unit 07.

The line image (overlappedby the traveled distance data; the same will hold in the following description) obtained by the line sensor camera 02 is converted by the A/D converter O5 from an analog signal to a digital signal, and stored in the hard disk 06. When the distance inspected is long, the amount of the image data is so huge that the capacity of the hard disk 06 needs to be large. The image data stored in the hard disk 06 is transferred to an MO disk 08 by the MO recording unit 07, where necessary.

At a place apart from the spot of inspection (the site where the tunnel wall surface inspection device is running), e.g., at a laboratory, an MO reproducing apparatus 09 and an image processor 010 are disposed. Thus, the image data are transferred from the hard disk 06 to the MO disk 08 on the spot of inspection. The MO disk 08 having records of the transferred data is carried from the spot of inspection to the laboratory or the like, where the image data are reproduced by the MO reproducing apparatus 09. The reproduced data are processed by the image processor 010, thus permitting the state of the tunnel wall surface T to be inspected and observed as images.

With the foregoing earlier technology, however, when the distance inspected is long, an immense capacity is needed for the hard disk 06. This makes the hard disk 06 expensive, eventually making the price of the entire device very high.

If the acquired data is carried around, it is necessary to transfer the image data from the hard disk 06 to a recording medium such as the MO disk 08. The transfer and carriage require several times the duration of measurement, causing inconvenience.

SUMMARY OF THE INVENTION

The present invention has been accomplished in the light of the earlier technology. An object of this invention is to provide a recording/reproducing system for use in a visual inspection device, the system being producible at a low cost, and being capable of shortening the period of time required for inspection; and to provide a method for recording/ reproduction by the recording/reproducing system.

An aspect of the present invention for attaining the above object comprises:

a line sensor camera moving, relative to an object to be inspected, in a moving direction intersecting a direction of arrangement of pixels, while shooting the object to be inspected, and outputting a line image;

an accumulator for successively accumulating respective line images, each of which extends in the direction of arrangement of pixels, so as to be sequentially arranged in the moving direction;

a controller for performing control such that whenever line images corresponding to lines of one frame by an image recording unit are accumulated in the accumulator in a state arranged in the moving direction, the accumulated images are divided, in the direction of arrangement of pixels, by a number which is obtained by dividing the number of pixels of the line sensor camera by the number of pixels of one frame of the image recording unit, and plane images obtained by division are outputted from the accumulator;

a signal converter for converting the plane images, which have been obtained by division, sequentially and chronologically into image signals for the image recording unit; and the image recording unit for recording the image signals for the image recording unit, which have been obtained by conversion, onto an image recording medium.

Another aspect of the present invention comprises:

causing a line sensor camera to move, relative to an object to be inspected, in a moving direction intersecting a direction of arrangement of pixels, while shooting the object to be inspected, and to output a line image;

successively accumulating respective line images, each of which extends in the direction of arrangement of pixels, so as to be sequentially arranged in the moving direction;

whenever line images corresponding to lines of one frame by an image recording unit are accumulated in a state arranged in the moving direction, dividing these accumulated image, in the direction of arrangement of pixels, by a number which is obtained by dividing the number of pixels of the line sensor camera by the number of pixels of one frame of the image recording unit, and converting plane images, which have been obtained by division, sequentially and chronologically into image signals for the image recording unit; and recording the image signals for the image recording unit, which have been obtained by conversion, onto an image recording medium by the image recording unit.

Still another aspect of the present invention comprises:

a line sensor camera moving, relative to an object to be inspected, in a moving direction intersecting a direction of arrangement of pixels, while shooting the object to be inspected, and outputting a line image;

an accumulator for successively accumulating respective line images, each of which extends in the direction of arrangement of pixels, so as to be sequentially arranged in the moving direction;

a moving distance meter for detecting a distance over which the line sensor camera has relatively moved, and outputting a moving distance integrated value;

a recording control unit for performing control such that whenever line images corresponding to lines of one frame by an image recording unit are accumulated in the accumulator in a state arranged in the moving direction, the accumulated images are divided, in the direction of arrangement of pixels, by a number which is obtained by dividing the number of pixels of the line sensor camera by the number of pixels of one frame of the image recording unit, and plane images obtained by division are outputted from the accumulator so as to be divided into a plurality of groups, and such that a code automatically assigned to each frame when an image signal for the image recording unit is recorded by the image recording unit onto an image recording medium is related to the moving distance integrated value, and the related code and moving distance integrated value are recorded in a relating recording medium by a relating recording unit;

a plurality of signal converters for converting the plane images in the respective groups, which have been obtained by division, sequentially and chronologically into image signals for the image recording units;

a plurality of the image recording units for recording a plurality of the image signals for the image recording units, which have been obtained by conversion, into respective image recording media;

a relating reproducing unit for reproducing the code and moving distance integrated value recorded relatedly in the relating recording medium;

an image reproducing unit for replaying the image recording medium having records of the image signals for the image recording unit and outputting the image signals for the image recording unit;

a reproduction control unit for performing control such that the image signal for the image recording unit corresponding to the image assigned the code corresponding to a designated moving distance integrated value is reproduced by the image reproducing unit; and an image processor for image processing a reproduced image to inspect the state of the object to be inspected.

A further aspect of the invention is such that the image processor combines a plurality of reproduced images together on the basis of the moving distance integrated values and the codes to restore them to the image before division, and image processes the restored image to inspect the state of the object to be inspected.

A still further aspect of the invention comprises:

causing a line sensor camera to move, relative to an object to be inspected, in a moving direction intersecting a direction of arrangement of pixels, while shooting the object to be inspected, and to output a line image;

successively accumulating respective line images, each of which extends in the direction of arrangement of pixels, so as to be sequentially arranged in the moving direction;

detecting a distance over which the line sensor camera has relatively moved, to determine a moving distance integrated value;

whenever line images corresponding to lines of one frame by an image recording unit are accumulated in a state arranged in the moving direction, dividing these accumulated images, in the direction of arrangement of pixels, by a number which is obtained by dividing the number of pixels of the line sensor camera by the number of pixels of one frame of the image recording unit, outputting plane images obtained by division so as to be divided into a plurality of groups, relating a code, which is automatically assigned to each frame when an image signal for the image recording unit is recorded by the image recording unit onto an image recording medium, to the moving distance integrated value, and recording the related code and moving distance integrated value onto a relating recording medium;

converting the plane images in the respective groups, which have been obtained by division, sequentially and chronologically into image signals for the image recording units;

recording a plurality of the image signals for the image recording units, which have been obtained by conversion, into respective image recording media;

reproducing the code and moving distance integrated value relatedly recorded in the relating recording medium, and reproducing the image signal for the image recording unit corresponding to the image assigned the code corresponding to a designated moving distance integrated value among the image signals for the image recording units recorded in the image recording media; and image processing a reproduced image to inspect the state of the object to be inspected.

An additional aspect of the invention comprises:

combining a plurality of reproduced images together on the basis of the moving distance integrated values and the codes to restore them to the image before division; and image processing the restored image to inspect the state of the object to be inspected.

DETAILED DESCRIPTION OF THE PREFERRED EMBODIMENTS

Embodiments of the present invention will now be described in detail with reference to the accompanying drawings. However, it is to be understood that these embodiments are given only for illustrative purposes and do not restrict the invention.

Figure 1:
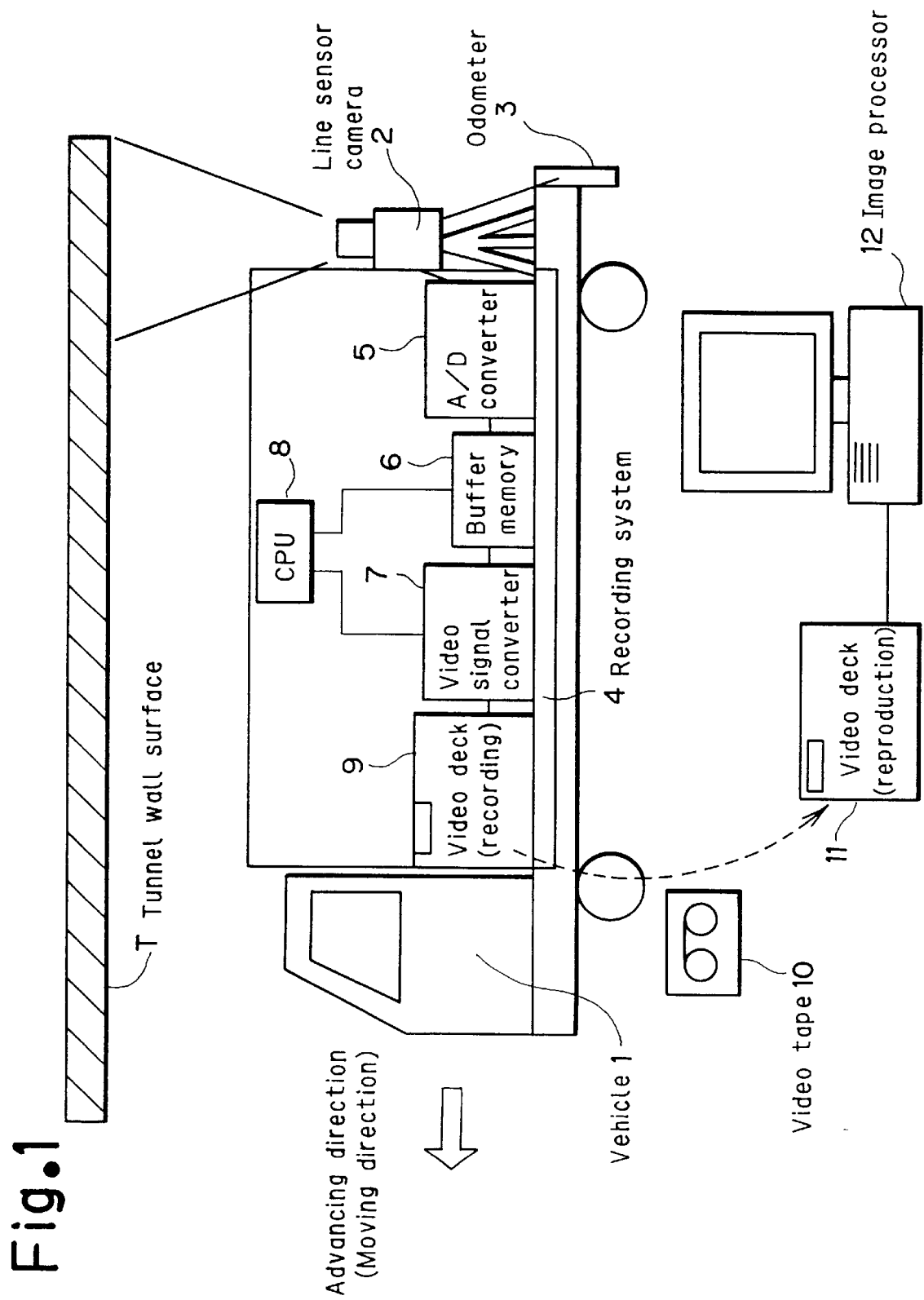
FIG. 1 is a construction diagram showing a tunnel wall surface inspection device concerned with a first embodiment of the present invention.

FIG. 1 is a construction diagram showing a tunnel wall surface inspection device (a visual inspection device) concerned with a first embodiment of the present invention. As shown in FIG. 1, a line sensor camera 2 is installed on a vehicle 1 of a tunnel wall surface inspection device. The line sensor camera 2 shoots a tunnel wall surface T when the vehicle 1 is traveling.

With the line sensor camera 2, single shooting gives an image only for one line (a line image). However, the line sensor camera 2 takes pictures continuously while moving in a direction intersecting (perpendicularly or nearly perpendicularly) the direction of arrangement of pixels of the line sensor camera 2. The resulting line images each extending in the direction of arrangement of pixels are successively and sequentially arranged in the moving direction, whereby a plane image elongated in a band form in the moving direction can be obtained. Thus, the use of the line sensor camera 2 enables images to be acquired with a fine image resolving power. According to the instant embodiment, the line sensor camera 2 used is of the type which forms a line image for one line from 2,048 pixels.

The vehicle 1 is also equipped with an odometer (a moving distance meter) 3, which measures a distance traveled by the vehicle 1. Data on the traveled distance detected is recorded so as to be superimposed on the line image data.

A recording system 4 is also mounted on the vehicle 1. The recording system 4 is composed of an A/D converter 5, a buffer memory 6, a video signal converter 7, a CPU 8, and a recording video deck (an image recording unit) 9, in addition to the line sensor camera 2.

The line image data (superimposed by the traveled distance data; the same will hold in the following description) obtained by the line sensor camera 2 is converted by the A/D converter 5 from an analog signal to a digital signal, and accumulated and stored in the buffer memory 6. The respective line image data are accumulated and stored, in a state arranged in the moving direction, in the buffer memory 6.

The accumulation and storage of the line image data in the buffer memory 6 are monitored and controlled by the CPU 8 (their details will be offered later on). Once the line image data corresponding to 472 lines are accumulated and stored in the buffer memory 6 in a state arranged in the moving direction (namely, when the image data corresponding to 2,048 pixels×472 lines have been accumulated and stored), these line image data are divided into four plane image data each corresponding to 512 pixels×472 lines. Under monitoring and control by the CPU 8, the four-divided plane image data are transferred to the video signal converter 7 in chronological order, and converted into video image signals by the video signal converter 7. The resulting video image signals are chronologically and successively recorded on a video tape 10 by the video deck 9.

At a place apart from the spot of inspection (the site where the tunnel wall surface inspection device is running), e.g., at a laboratory, a video deck 11 for reproduction and an image processor 12 are disposed. Thus, the video tape 10 having the video image data recorded by the recording video deck 9 on the spot of inspection is carried from the spot of inspection to the laboratory or the like. At the laboratory or the like, images shot are reproduced by the video deck 11 for reproduction, and processed by the image processor 12. As a result, the state of the tunnel wall surface T can be inspected and observed as images, and the results of inspection displayed.

According to the instant embodiment, the recording medium is the video tape 10, so that the device can be constituted at a low cost. Moreover, the data acquired is easily portable, so that the time required for inspection can be shortened.

Next, descriptions will be given of the accumulation and storage of line image data in the buffer memory 6, and a control method for an image format by which once a certain amount of data is accumulated, this data is divided and outputted as plane image data in chronological order for conversion into video image signals. This image format control method has been designed to be able to ensure a high inspection accuracy (image resolving power) even when the data is recorded on the video tape 10.

Figure 2:
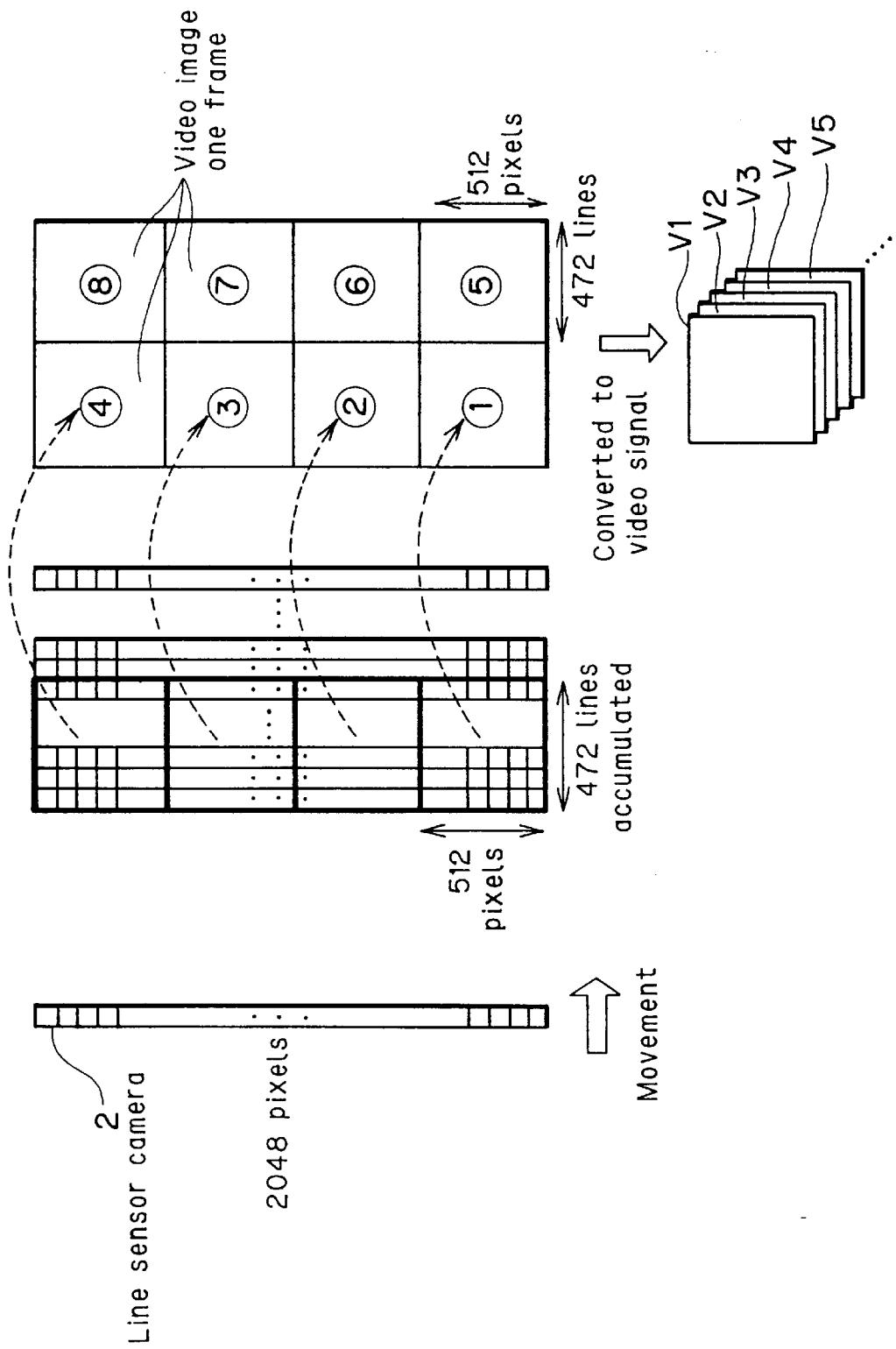
FIG. 2 is an explanation drawing showing the way of image processing in the first embodiment.

As shown in FIG. 2, the line sensor camera 2 forms a line image for one line from 2,048 pixels (picture elements). Thus, the line sensor camera 2 takes pictures continuously while moving in a direction perpendicular to the direction of arrangement of pixels of the line sensor camera 2. The resulting line images each extending in the direction of arrangement of pixels are successively and sequentially arranged in the moving direction, whereby a plane image elongated in a band form in the moving direction can be obtained.

The resolution per frame of the video deck 9 is about 512 pixels×472 lines. Thus, digitized line image data are accumulated and stored in the buffer memory 6 in a state arranged in the moving direction. Whenever the line image data corresponding to 472 lines are accumulated and stored in the buffer memory 6 in a state arranged in the moving direction (namely, each time the image data corresponding to 2,048 pixels×472 lines are accumulated and stored), these line image data are divided into four plane image data each corresponding to 512 pixels×472 lines. In short, the line image data are divided in agreement with the resolution of the video deck 9.

Under monitoring and control by the CPU 8, the four-divided plane image data (e.g., ① to ⑧) are transferred to the video signal converter 7 in chronological order, and converted into video image signals (e.g., V1 to V8) by the video signal converter 7. That is, the plane image data corresponding to 512 pixels×427 lines is converted to a video image signal for one frame. The resulting video image signals (e.g., V1 to V8) are recorded on the video tape 10 by the video deck 9 as chronologically and successively arranged video image signals.

As noted above, whenever the line image data are incorporated into the buffer memory 6 in an amount corresponding to the number of lines of the frame of the video deck (image recording unit) 9, the line image data are divided in the direction of arrangement of the picture elements by the number {(the number of pixels of the line sensor camera)/(the number of pixels of the video deck)}. The resulting plane image data are converted to video image signals, and recorded chronologically and continuously. Even when the image data are recorded in the video deck 9 as video image signals, therefore, the data can be recorded without degrading the resolution of the line sensor camera 2.

In the foregoing embodiment, the number of pixels of the line sensor camera 2 is set at 2,048. However, the present invention can be applied, even when the number of pixels is 3,000 or 4,000. When the number of pixels is increased, it suffices to make the image divisor larger in converting the image data to video image signals. By employing the same method as described earlier, recording becomes possible without decline in the resolution.

Figure 3:
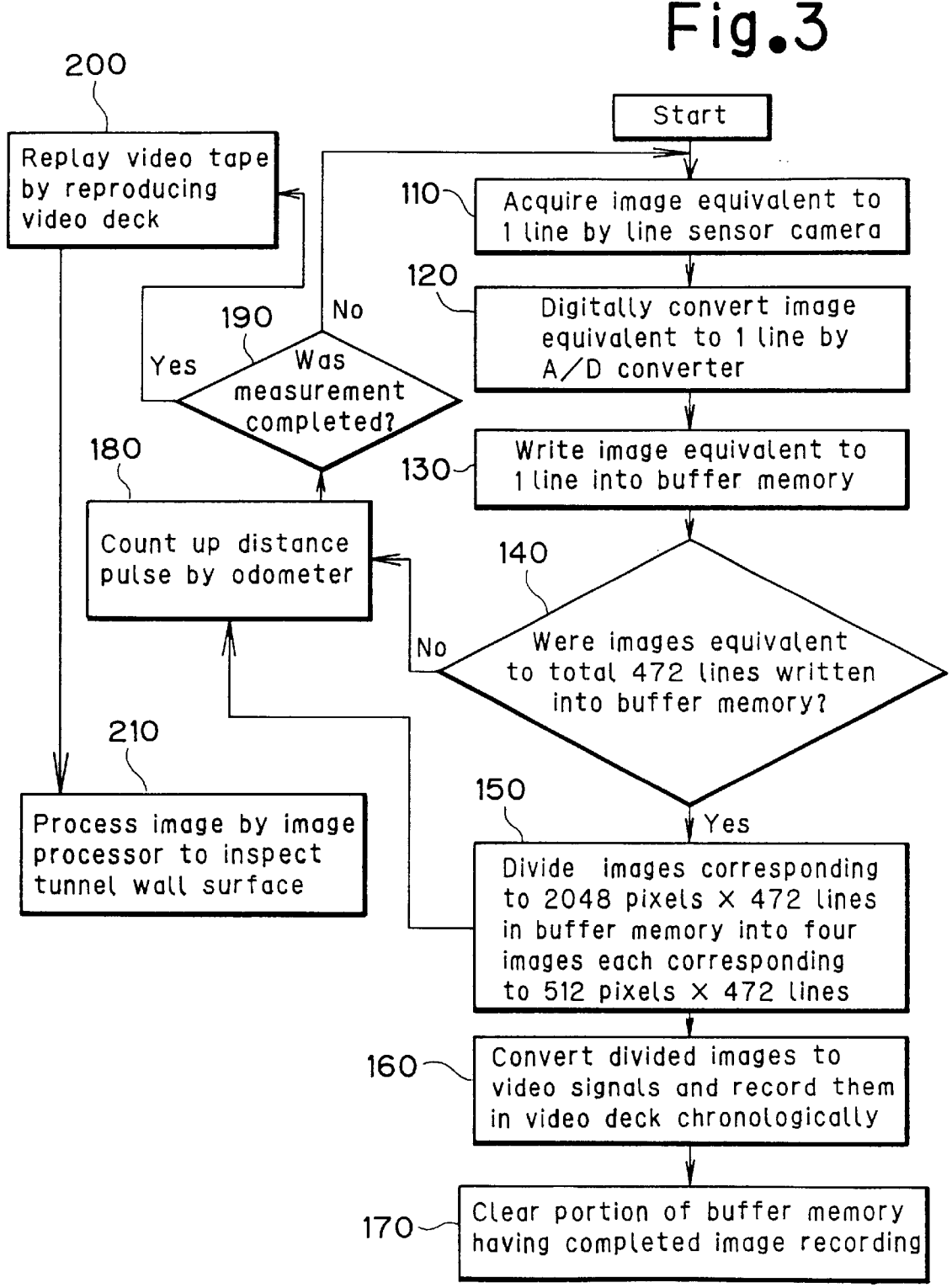
FIG. 3 is a flow chart showing actions in the first embodiment.

Next, FIG. 3, a flow chart, will be referred to for describing the overall procedure.

As the vehicle 1 proceeds, the odometer 3 is counted up (step 180). When the odometer 3 is counted up, a line image for one line is acquired by the line sensor camera 2 (step 110). The acquired line image is converted in digital form by the A/D converter 5 and recorded in the buffer memory 6 (steps 120, 130).

The writing of the line image into the buffer memory 6 is monitored by the CPU 8. When the line images corresponding to 472 lines have been written into the buffer memory 6, the flow goes to step 150. Otherwise, the flow returns to step 180, and the processing, starting with step 110, is repeated again (step 140).

When the line images corresponding to 472 lines have been written into the buffer memory 6, the images equivalent to 2048 pixels×472 lines within the buffer memory 6 are divided into four plane images each equivalent to 512 pixels×472 lines (step 150, see FIG. 2).

Until steps 180, 110 and subsequent steps are repeated past step 180 and line images corresponding to 472 lines are written into the buffer memory 6 again, steps 160, 170 are carried out.

At step 160, the four plane images created by division at step 150 are converted to video image signals in chronological order, and the video image signals are recorded on the video tape 10 by the video deck 9.

After recording by the video deck 9 is completed, a portion of the buffer memory 6 holding the plane image whose recording in the video deck 9 has been completed is cleared for use in image writing from the line sensor camera 2 again (step 170).

When measurement is judged at step 190 to be completed, the video tape 10 is taken out of the video deck 9, and played back by the video deck 11 for reproduction (step 200).

Reproduced images are image processed by the image processor 12 to perform inspection of the tunnel wall surface T (step 210). The inspection at step 210 may be performed with the human naked eye, rather than with the image processor 12.

According to this embodiment, as described above, the recording unit is composed of the video deck 9. Thus, the video tape 10, an inexpensive recording medium, can be used, so that the inspection device can be produced for a low price compared with earlier technologies (using a hard disk).

Furthermore, the image data are recorded, where necessary, on the video tape 10 during measurement. Thus, a step required for carriage of data with the earlier technology (using a hard disk), i.e., transfer of the data from the hard disk to an MO disk or the like, becomes unnecessary, shortening the inspection time.

A tunnel wall surface inspection device concerned with a second embodiment of the present invention will now be described.

Figure 4:
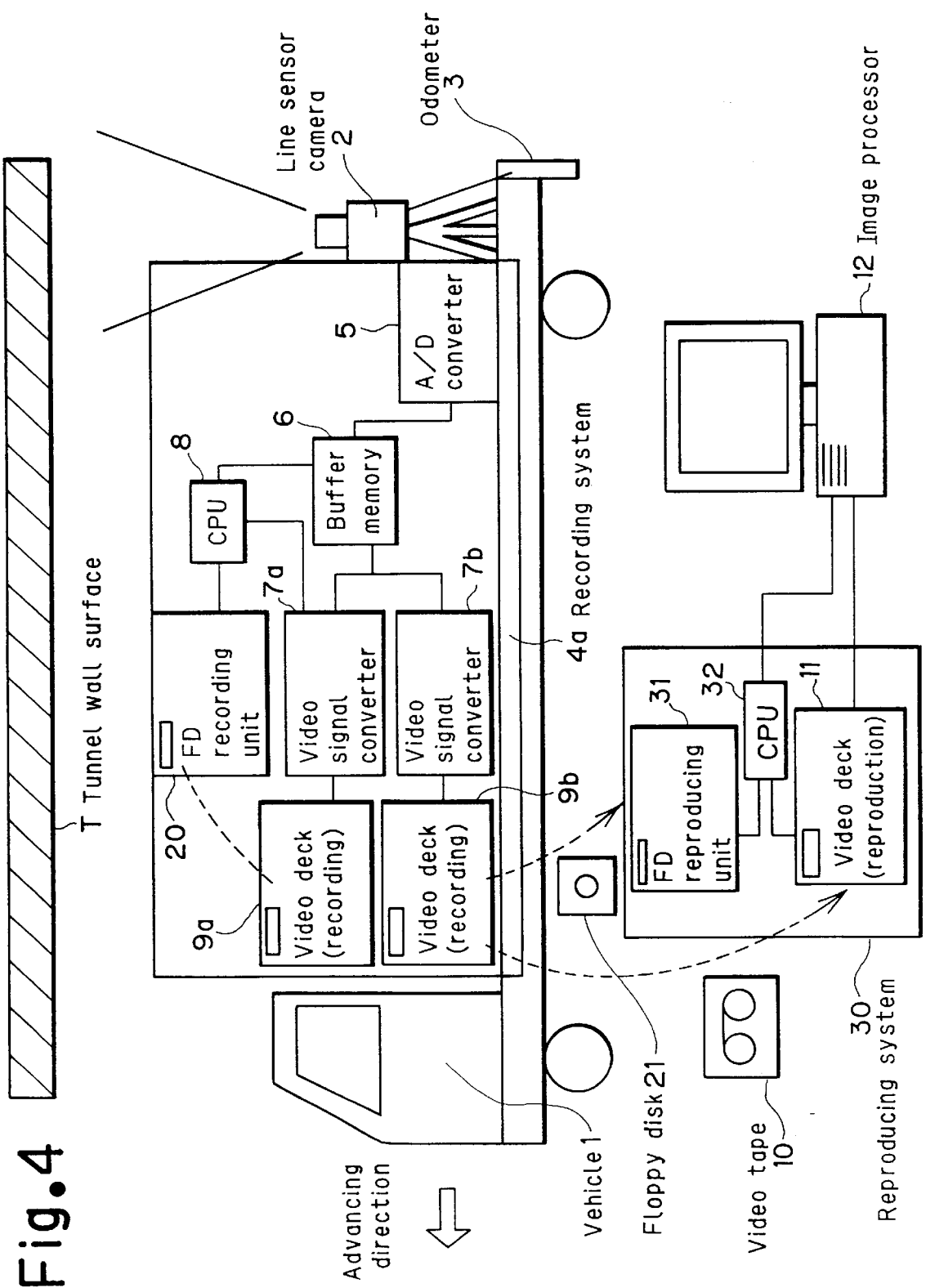
FIG. 4 is a construction diagram showing a tunnel wall surface inspection device concerned with a second embodiment of the present invention.

The tunnel wall surface inspection device concerned with the second embodiment is of a constitution as illustrated in FIG. 4. Its differences from the first embodiment are that a recording system 4a is equipped with two video signal converters 7a, 7b and two video decks 9a, 9b, and is also provided with an FD (floppy disk) recording unit (a relating reproducing unit) 20 newly; and that as a reproducing system 30, an FD reproducing unit (a relating reproducing unit) 31 and a CPU 31 are disposed in addition to a video deck 11.

Constitution of the other parts is the same as in the first embodiment shown in FIG. 1. Thus, in the description to follow, portions different from the first embodiment will be mainly explained, and the same explanations as in the first embodiment will be omitted.

The two video signal converters 7a, 7b act in the following manner based on control by a CPU 8 for recording control: These converters 7a, 7b divide images, which have been written into a buffer memory 6 (plane images), into two groups (details will be given later on). The plane images of the first group are converted to video image signals by the video signal converter 7a, while the plane images of the second group are converted to video image signals by the video signal converter 7b.

The video deck 9a records the video image signals formed by the video signal converter 7a onto a video tape 10. Whereas the video deck 9b records the video image signals formed by the video signal converter 7b onto a video tape 10. The video decks 9a and 9b accommodate their respective video tapes 10.

Time codes (numbers automatically assigned by the video deck to respective frames of video images) developed at the time of recording the video image signals in the video decks 9a, 9b, and the corresponding traveled distance integrated values (moving distance integrated values) of an odometer (moving distance meter) 3 are gathered in the CPU 8. In the CPU 8, the time codes and the traveled distance integrated values are related to each other, and recorded by the FD recording unit 20 onto a floppy disk 21.

The FD reproducing unit 31 of the reproducing system 30 plays back the floppy disk 21 in which the time codes and the traveled distance integrated values have been recorded relatedly by the FD recording unit 20.

The CPU 32 for controlling reproduction by the reproducing system 30 reads the time codes and the traveled distance integrated values reproduced by the FD reproducing unit 31, and also reads the time code corresponding to the traveled distance integrated value that is designated by an image processor 12. The CPU 32 further performs reproduction control for the video deck 11 so that of the images (frames) of the video tape 10, the image (frame) assigned the time code corresponding to the traveled distance integrated value designated by the image processor 12 is reproduced by the video deck 11.

Figure 5:
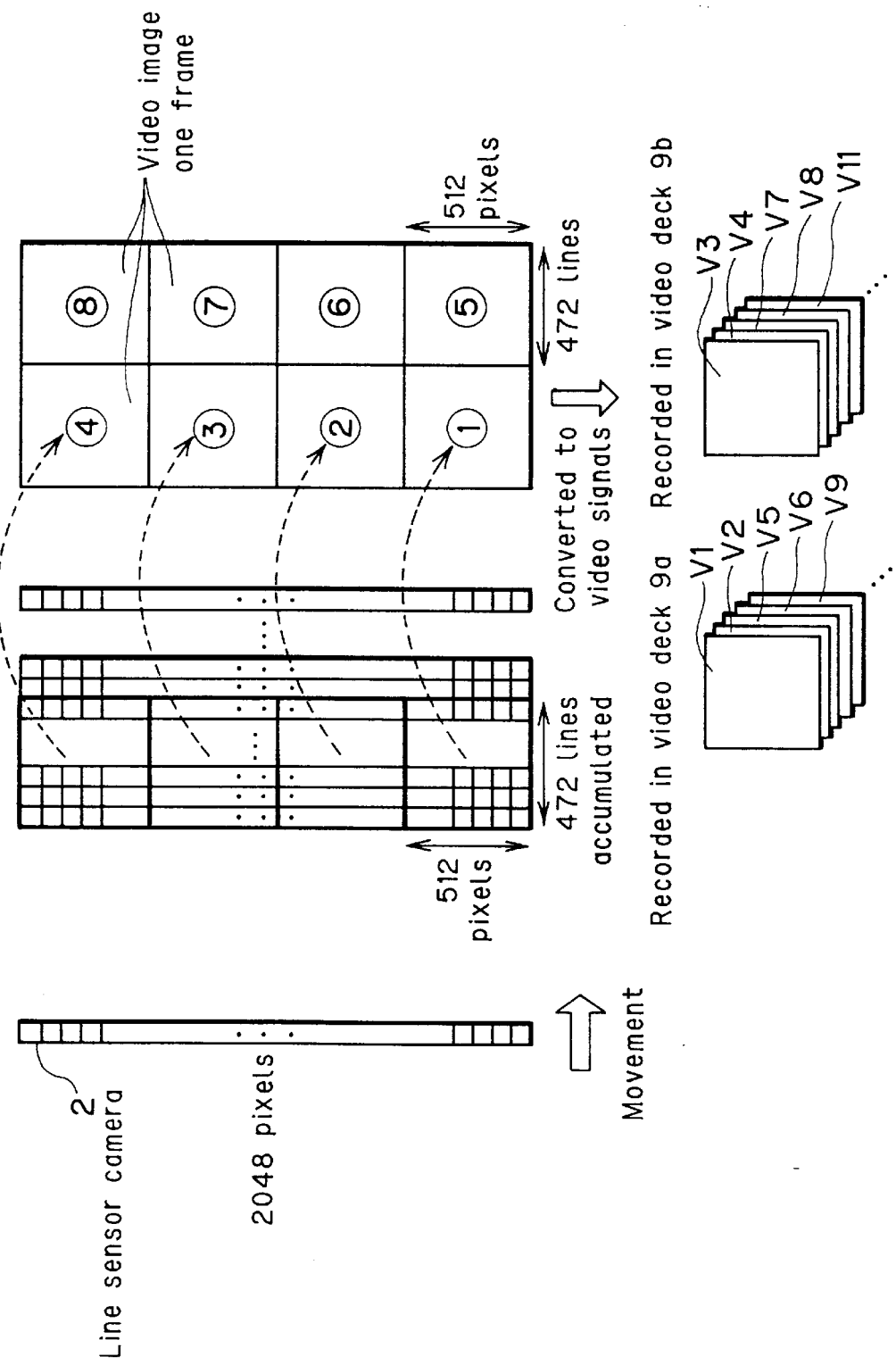
FIG. 5 is an explanation drawing showing the way of image processing in the second embodiment.

FIG. 5 shows the state of actions based on control by the CPU 8, actions such that images written into the buffer memory 6 (plane images) are divided into two groups, and the plane images of the first group are converted to video image signals by the video signal converter 7a and recorded onto the video tape 10 by the video deck 9a, while the plane images of the second group are converted to video image signals by the video signal converter 7b and recorded onto the video tape 10 by the video deck 9b. The method of accumulating the line image data in a constant amount (equivalent to 472 lines), and then dividing this data into four parts to obtain plane image data is the same as in the first embodiment illustrated in FIG. 2. Thus, an explanation for actions relevant to this method will be omitted.

As shown in FIG. 5, plane images ①to ④, for example, are divided into a first group consisting of plane images ①and ②, and a second group composed of plane images ③ and ④. The plane images ① and ② of the first group are converted to video image signals V1, V2 by the video signal converter 7a and recorded onto the video tape 10 by the video deck 9a. Whereas the plane images ③ and ④ of the second group are converted to video image signals V3, V4 by the video signal converter 7b and recorded onto the video tape 10 by the video deck 9b.

Likewise, plane images ⑤ to ⑧ obtained from line images equivalent to the next 472 lines are divided into plane images ①, ⑥, and plane images ⑦, ⑧, and recorded by the video decks 9a, 9b dividedly as video signals V5, V6 and video signals V7, V8, respectively. Thus, the video signals V1, V2, V5, V6, V9 and so forth are recorded in the video deck 9a, while the video signals V3, V4, V7, V8, V11 and so forth are recorded in the video deck 9b.

Figure 6:
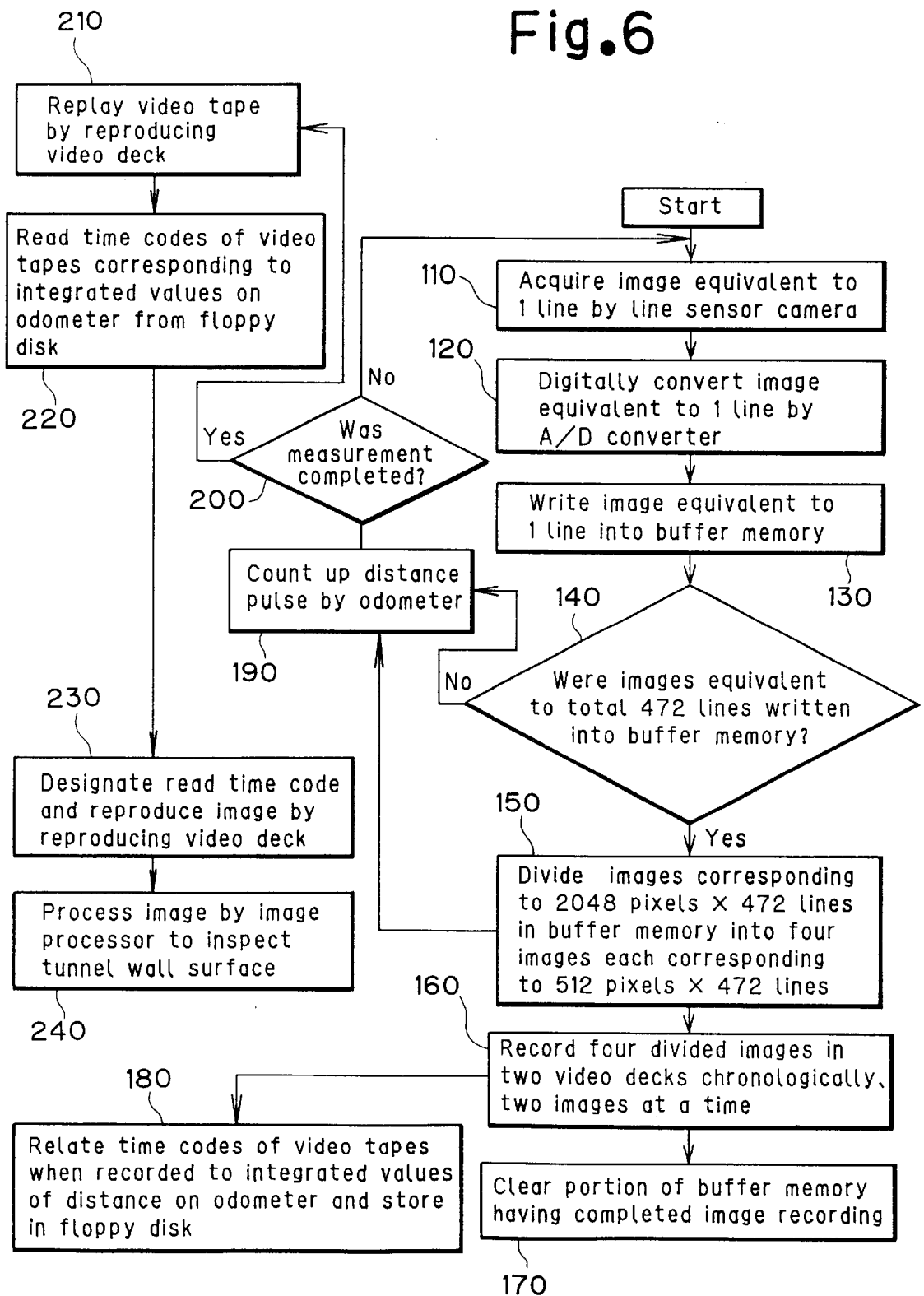
FIG. 6 is a flow chart showing actions in the second embodiment.
Figure 7:
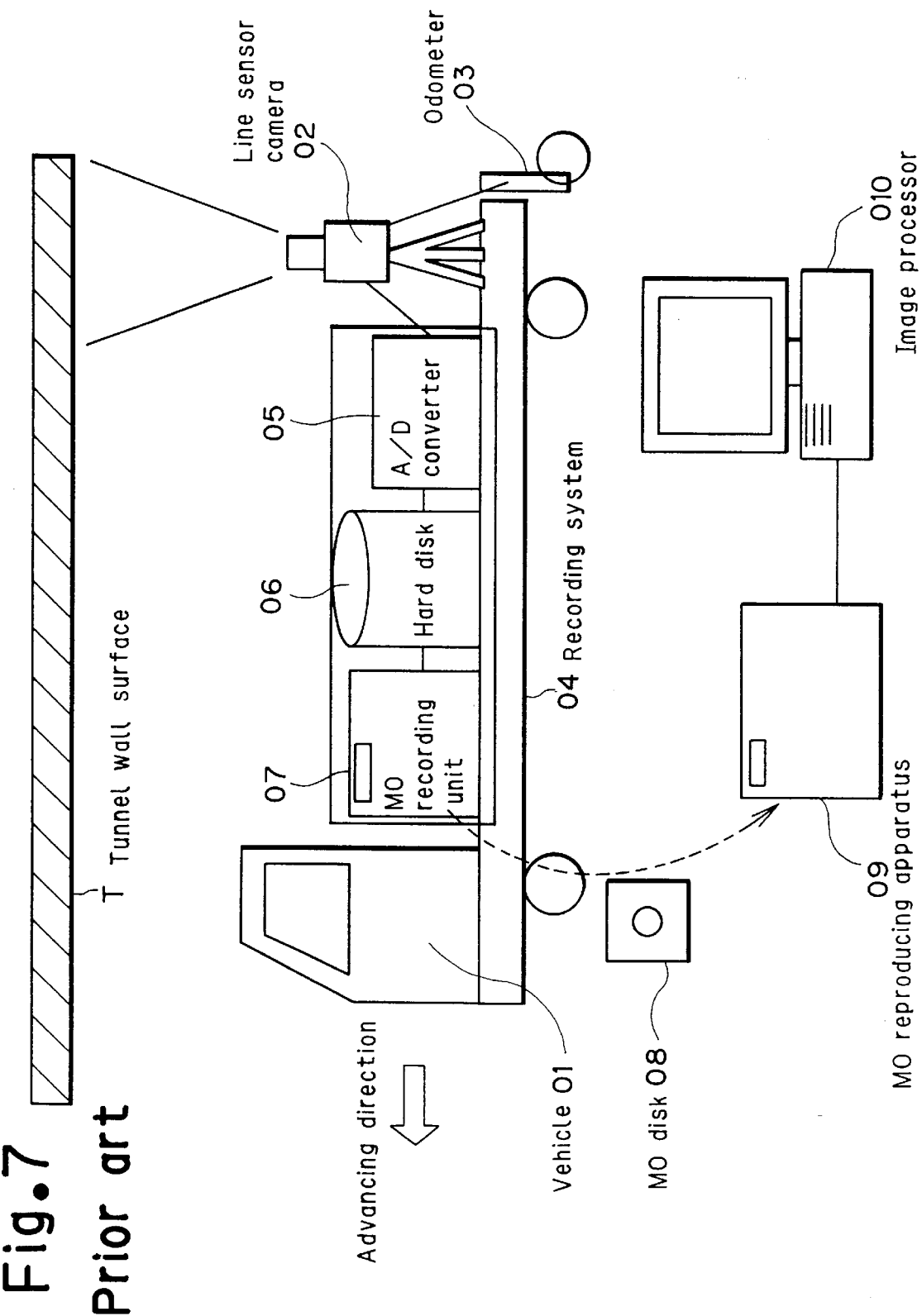
FIG. 7 is a construction diagram showing a conventional tunnel wall surface inspection device.

The overall procedure of the second embodiment will now be described with reference to the flow chart, FIG. 6, with emphasis on portions different from the first embodiment.

The processing from the counting-up of the odometer 3 (step 190) until the division of images in the buffer memory 6 (step 110 to step 150) is the same as in the first embodiment.

According to the instant embodiment, four plane images (e.g., ①, ②, ③, ④) after division are divided into a first group (e.g., ①, ②) and a second group (e.g., ③, ④). Video image signals (e.g., V1, V2) converted from plane images (e.g., ①, ②) are recorded on the video tape 10 by the video deck 9a. Simultaneously, video image signals (e.g., V3, V4) converted from plane images (e.g., ③, ④) are recorded on the video tape 10 by the video deck 9b (step 160).

After all, the video tapes 10, 10 recorded by the two video decks 9a, 9b have records of images divided into two groups, as shown in FIG. 5.

After recording by the video decks 9a, 9b is completed, a portion of the buffer memory 6 holding the plane images whose recording in the video decks 9a, 9b has been completed is cleared to be used again in image writing from the line sensor camera 2 (step 170).

Generally, in recording an image in a video deck, it takes a thirtieth of a second to record one plane image. According to the first embodiment, four plane images are recorded in one video deck, so that 4/30ths of a second is taken for image recording. According to the instant embodiment, on the other hand, two plane images are recorded at a time in each of the two video decks 9a, 9b, so that the time required for image recording is shortened to 2/30ths of a second. Hence, the recording speed can be increased according to the second embodiment.

Before steps 110 to 140 and 190 are repeated to write line images corresponding to 472 lines into the buffer memory 6, the processing at steps 160, 170 needs to be completed. Thus, the following operating conditions shall be met for the instant device:

(Duration of writing of images corresponding to 472 lines)≧(Duration of recording in video decks)

In other words, if "the duration of recording in the video decks" is short, "the duration of writing of images corresponding to 472 lines" can be shortened. To maintain the accuracy of inspection, the interval between pulse occurrences by the odometer 3 (e.g., one pulse after each travel of 1 mm) is constant. The fact that "the duration of writing of images corresponding to 472 lines" can be shortened, therefore, means that the traveling speed of the vehicle 1 during inspection can be increased.

The time codes of the video tapes 10, 10 when recorded and the traveled distance integrated values of the odometer 3 are related to each other under control by the CPU 8 for recording control, and recorded and stored in the floppy disk 21 by the FD recording unit 20 (step 180).

In replaying the video tapes 10, 10, which have been recorded by the two video decks 9a, 9b, by the video deck 11 (step 210), the relatedly recorded time code and traveled distance integrated value are reproduced from the floppy disk 21 by the FD reproducing unit 31 of the reproducing system 30, and the time code and traveled distance integrated value are read by the CPU 32 (step 220).

The CPU 32 designates the time code of the image to be reproduced by the video deck 11, and causes the video deck 11 to reproduce the video image assigned the designated time code (step 230). By so reproducing the image designated based on the time code with reference to the data in the floppy disk 21, it becomes possible to designate and read the data at an arbitrary distance point.

The reproduced designated image and the traveled distance integrated value are sent to the image processor 12. The image processor 12 efficiently reconstructs (assembles) the image before division from the two video tapes separately replayed on the basis of the traveled distance integrated values, and processes the reconstructed image to inspect and observe the state of the tunnel wall surface (step 240).

According to the above-described two embodiments, the object to be inspected (tunnel wall surface) is stationary, while the line sensor camera moves. However, it goes without saying that the present invention can be applied in a situation in which the object to be inspected (e.g., a long vehicle) moves, while the line sensor camera is stationary.

As described concretely above along with the embodiments, the present invention is configured to comprise:

a line sensor camera moving, relative to an object to be inspected, in a moving direction intersecting a direction of arrangement of pixels, while shooting the object to be inspected, and outputting a line image;

an accumulator for successively accumulating respective line images, each of which extends in the direction of arrangement of pixels, so as to be sequentially arranged in the moving direction;

a controller for performing control such that whenever line images corresponding to lines of one frame by an image recording unit are accumulated in the accumulator in a state arranged in the moving direction, the accumulated images are divided, in the direction of arrangement of pixels, by a number which is obtained by dividing the number of pixels of the line sensor camera by the number of pixels of one frame of the image recording unit, and plane images obtained by division are outputted from the accumulator;

a signal converter for converting the plane images, which have been obtained by division, sequentially and chronologically into image signals for the image recording unit; and the image recording unit for recording the image signals for the image recording unit, which have been obtained by conversion, onto an image recording medium.

The present invention is also configured to comprise:

causing a line sensor camera to move, relative to an object to be inspected, in a moving direction intersecting a direction of arrangement of pixels, while shooting the object to be inspected, and to output a line image;

successively accumulating respective line images, each of which extends in the direction of arrangement of pixels, so as to be sequentially arranged in the moving direction;

whenever line images corresponding to lines of one frame by an image recording unit are accumulated in a state arranged in the moving direction, dividing these accumulated image, in the direction of arrangement of pixels, by a number which is obtained by dividing the number of pixels of the line sensor camera by the number of pixels of one frame of the image recording unit, and converting plane images, which have been obtained by division, sequentially and chronologically into image signals for the image recording unit; and recording the image signals for the image recording unit, which have been obtained by conversion, onto an image recording medium by the image recording unit.

The present invention is also configured to comprise:

a line sensor camera moving, relative to an object to be inspected, in a moving direction intersecting a direction of arrangement of pixels, while shooting the object to be inspected, and outputting a line image;

an accumulator for successively accumulating respective line images, each of which extends in the direction of arrangement of pixels, so as to be sequentially arranged in the moving direction;

a moving distance meter for detecting a distance over which the line sensor camera has relatively moved, and outputting a moving distance integrated value;

a recording control unit for performing control such that whenever line images corresponding to lines of one frame by an image recording unit are accumulated in the accumulator in a state arranged in the moving direction, the accumulated images are divided, in the direction of arrangement of pixels, by a number which is obtained by dividing the number of pixels of the line sensor camera by the number of pixels of one frame of the image recording unit, and plane images obtained by division are outputted from the accumulator so as to be divided into a plurality of groups, and such that a code automatically assigned to each frame when an image signal for the image recording unit is recorded by the image recording unit onto an image recording medium is related to the moving distance integrated value, and the related code and moving distance integrated value are recorded in a relating recording medium by a relating recording unit;

a plurality of signal converters for converting the plane images in the respective groups, which have been obtained by division, sequentially and chronologically into image signals for the image recording units;

a plurality of the image recording units for recording a plurality of the image signals for the image recording units, which have been obtained by conversion, into respective image recording media;

a relating reproducing unit for reproducing the code and moving distance integrated value recorded relatedly in the relating recording medium;

an image reproducing unit for replaying the image recording medium having records of the image signals for the image recording unit and outputting the image signals for the image recording unit;

a reproduction control unit for performing control such that the image signal for the image recording unit corresponding to the image assigned the code corresponding to a designated moving distance integrated value is reproduced by the image reproducing unit; and an image processor for image processing a reproduced image to inspect the state of the object to be inspected.

The present invention is also configured such that the image processor combines a plurality of reproduced images together on the basis of the moving distance integrated values and the codes to restore them to the image before division, and image processes the restored image to inspect the state of the object to be inspected.

The present invention is also configured to comprise:

causing a line sensor camera to move, relative to an object to be inspected, in a moving direction intersecting a direction of arrangement of pixels, while shooting the object to be inspected, and to output a line image;

successively accumulating respective line images, each of which extends in the direction of arrangement of pixels, so as to be sequentially arranged in the moving direction;

detecting a distance over which the line sensor camera has relatively moved, to determine a moving distance integrated value;

whenever line images corresponding to lines of one frame by an image recording unit are accumulated in a state arranged in the moving direction, dividing these accumulated images, in the direction of arrangement of pixels, by a number which is obtained by dividing the number of pixels of the line sensor camera by the number of pixels of one frame of the image recording unit, outputting plane images obtained by division so as to be divided into a plurality of groups, relating a code, which is automatically assigned to each frame when an image signal for the image recording unit is recorded by the image recording unit onto an image recording medium, to the moving distance integrated value, and recording the related code and moving distance integrated value onto a relating recording medium;

converting the plane images in the respective groups, which have been obtained by division, sequentially and chronologically into image signals for the image recording units;

recording a plurality of the image signals for the image recording units, which have been obtained by conversion, into respective image recording media;

reproducing the code and moving distance integrated value relatedly recorded in the relating recording medium, and reproducing the image signal for the image recording unit corresponding to the image assigned the code corresponding to a designated moving distance integrated value among the image signals for the image recording units recorded in the image recording media; and image processing a reproduced image to inspect the state of the object to be inspected.

The present invention is also configured to comprise:

combining a plurality of reproduced images together on the basis of the moving distance integrated values and the codes to restore them to the image before division; and image processing the restored image to inspect the state of the object to be inspected.

Because of the foregoing configurations, the present invention can use an image recording medium (video tape), and thus produce a recording/reproducing system for a visual inspection device at a low cost. Furthermore, the data acquired can be easily carried around to shorten the time required for inspection.

By employing a control method involving a special image format, a high inspection accuracy (image resolving power) can be ensured, even when data are recorded on the image recording me dium (video tape).

The moving distance integrated value (traveled distance integrated value) and the code (time code) are recorded in a related manner. Thus, an image assigned the code corresponding to a designated moving distance integrated value is specified at the time of reproduction, and can be easily reproduced.

By using a plurality of image recording units, the time required for inspection can be further shortened. Besides, the moving distance integrated value (traveled distance integrated value) and the code (time code) are recorded relatedly. Thus, divided images can be easily combined together to restore them to the image before division.

What is claimed is:

1. A recording system for a visual inspection device, said recording system comprising:

a line sensor camera moving, relative to an object to be inspected, in a moving direction intersecting a direction of arrangement of pixels, while shooting the object to be inspected, and outputting a line image;

an accumulator for successively accumulating respective line images, each of which extends in the direction of arrangement of pixels, so as to be sequentially arranged in the moving direction;

a controller for performing control such that whenever line images corresponding to lines of one frame by an image recording unit are accumulated in the accumulator in a state arranged in the moving direction, the accumulated images are divided, in the direction of arrangement of pixels, by a number which is obtained by dividing the number of pixels of the line sensor camera by the number of pixels of one frame of the image recording unit, and plane images obtained by division are outputted from the accumulator;

a signal converter for converting the plane images, which have been obtained by division, sequentially and chronologically into image signals for the image recording unit; and said image recording unit for recording the image signals for the image recording unit, which have been obtained by conversion, onto an image recording medium.

2. A recording method of a recording system for a visual inspection device, said recording method comprising:

causing a line sensor camera to move, relative to an object to be inspected, in a moving direction intersecting a direction of arrangement of pixels, while shooting the object to be inspected, and to output a line image;

successively accumulating respective line images, each of which extends in the direction of arrangement of pixels, so as to be sequentially arranged in the moving direction;

whenever line images corresponding to lines of one frame by an image recording unit are accumulated in a state arranged in the moving direction, dividing these accumulated image, in the direction of arrangement of pixels, by a number which is obtained by dividing the number of pixels of the line sensor camera by the number of pixels of one frame of the image recording unit, and converting plane images, which have been obtained by division, sequentially and chronologically into image signals for the image recording unit; and recording the image signals for the image recording unit, which have been obtained by conversion, onto an image recording medium by the image recording unit.

3. A recording/reproducing system for a visual inspection device, said recording/reproducing system comprising:

a line sensor camera moving, relative to an object to be inspected, in a moving direction intersecting a direction of arrangement of pixels, while shooting the object to be inspected, and outputting a line image;

an accumulator for successively accumulating respective line images, each of which extends in the direction of arrangement of pixels, so as to be sequentially arranged in the moving direction;

a moving distance meter for detecting a distance over which the line sensor camera has relatively moved, and outputting a moving distance integrated value;

a recording control unit for performing control such that whenever line images corresponding to lines of one frame by an image recording unit are accumulated in the accumulator in a state arranged in the moving direction, the accumulated images are divided, in the direction of arrangement of pixels, by a number which is obtained by dividing the number of pixels of the line sensor camera by the number of pixels of one frame of the image recording unit, and plane images obtained by division are outputted from the accumulator so as to be divided into a plurality of groups, and such that a code automatically assigned to each frame when an image signal for the image recording unit is recorded by the image recording unit onto an image recording medium is related to the moving distance integrated value, and the related code and moving distance integrated value are recorded in a relating recording medium by a relating recording unit;

a plurality of signal converters for converting the plane images in the respective groups, which have been obtained by division, sequentially and chronologically into image signals for the image recording units;

a plurality of the image recording units for recording a plurality of the image signals for the image recording units, which have been obtained by conversion, into respective image recording media;

a relating reproducing unit for reproducing the code and moving distance integrated value recorded relatedly in the relating recording medium;

an image reproducing unit for replaying the image recording medium having records of the image signals for the image recording unit and outputting the image signals for the image recording unit;

a reproduction control unit for performing control such that the image signal for the image recording unit corresponding to the image assigned the code corresponding to a designated moving distance integrated value is reproduced by the image reproducing unit; and an image processor for image processing a reproduced image to inspect the state of the object to be inspected.

4. The recording/reproducing system for a visual inspection device as claimed in claim 3, wherein the image processor combines a plurality of reproduced images together on the basis of the moving distance integrated values and the codes to restore them to the image before division, and image processes the restored image to inspect the state of the object to be inspected.

5. A recording/reproducing method of a recording/reproducing system for a visual inspection device, said recording/reproducing method comprising:

causing a line sensor camera to move, relative to an object to be inspected, in a moving direction intersecting a direction of arrangement of pixels, while shooting the object to be inspected, and to output a line image;

successively accumulating respective line images, each of which extends in the direction of arrangement of pixels, so as to be sequentially arranged in the moving direction;

detecting a distance over which the line sensor camera has relatively moved, to determine a moving distance integrated value;

whenever line images corresponding to lines of one frame by an image recording unit are accumulated in a state arranged in the moving direction, dividing these accumulated images, in the direction of arrangement of pixels, by a number which is obtained by dividing the number of pixels of the line sensor camera by the number of pixels of one frame of the image recording unit, outputting plane images obtained by division so as to be divided into a plurality of groups, relating a code, which is automatically assigned to each frame when an image signal for the image recording unit is recorded by the image recording unit onto an image recording medium, to the moving distance integrated value, and recording the related code and moving distance integrated value onto a relating recording medium;

converting the plane images in the respective groups, which have been obtained by division, sequentially and chronologically into image signals for the image recording units;

recording a plurality of the image signals for the image recording units, which have been obtained by conversion, into respective image recording media;

reproducing the code and moving distance integrated value relatedly recorded in the relating recording medium, and reproducing the image signal for the image recording unit corresponding to the image assigned the code corresponding to a designated moving distance integrated value among the image signals for the image recording units recorded in the image recording media; and image processing a reproduced image to inspect the state of the object to be inspected.

6. The recording/reproducing method of a recording/reproducing system for a visual inspection device as claimed in claim 5, said recording/reproducing method further comprising:

combining a plurality of reproduced images together on the basis of the moving distance integrated values and the codes to restore them to the image before division; and image processing the restored image to inspect the state of the object to be inspected.

* * * * *